Figure 1:
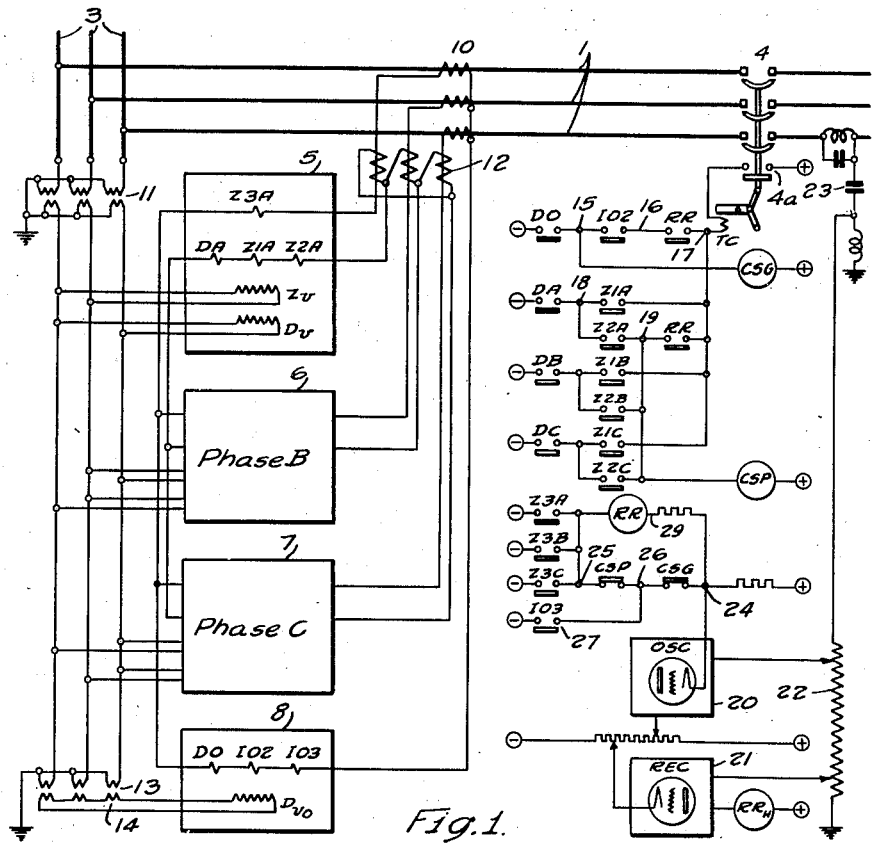

Aug. 7, 1945.  S. L. GOLDSBOROUGH  2,381,277
DIRECTIONAL GROUND PREFERENCE RELAYING

Filed Dec. 8, 1943

WITNESSES:

INVENTOR
Shirley L. Goldsborough.
BY
ATTORNEY

Patented Aug. 7, 1945

2,381,277

UNITED STATES PATENT OFFICE 2,381,277

DIRECTIONAL GROUND PREFERENCE RELAYING

Shirley L. Goldsborough, Basking Ridge, N. J., assignor to Westinghouse Electric Corporation, East Pittsburgh, Pa., a corporation of Pennsylvania Application December 8, 1943, Serial No. 513,357

13 Claims. (Cl. 175—294)

This invention relates to the "ground preference" feature of carrier-current relaying systems for protecting polyphase transmission-lines against faults. The "ground-preference" feature is utilized in all of the more common present-day carrier-current relaying-systems, and it provides that, during faults involving ground-current, the ground relays supersede, or take preference over, the phase relays in controlling the starting and stopping of the carrier-current transmission. The reasons which have led to the adoption of "ground preference" relaying have to do with the possibility of erroneous responses of the phase relays under certain fault-conditions involving zero-sequence and/or negative-sequence current-components, and these reasons for the employment of ground preference form no part of the present contribution to the art.

The object of the present invention is to avoid a difficulty which is inherent in previous ground-preference relaying-systems, in which it has been possible for the carrier current to be put on the protected line-section in response to a sensitive non-directional ground-fault relay which is more sensitive than the directionally responsive or controlled element which removes the carrier current from the line-section. This may happen in the event of internal phase-to-phase faults or internal three-phase faults having either only a light ground-current, or a spurious ground-current which is due to errors in the current-transformers, by "internal fault" meaning a fault on or within the protected line-section. In the common present-day carrier-current systems, the presence of carrier current on the protected section is utilized to indicate that a fault is external, or outside of the protected section, so that the carrier-current is utilized to block an unwanted tripping action. In the case of the internal phase-faults having light or spurious ground-currents which are sufficient to pick up the sensitive ground-fault carrier-starting elements, but not sufficient to pick up the carrier-stopping elements, a condition will result in which the ground-fault relays will erroneously keep the carrier-current on the protected line-section, thus preventing instaneous or carrier-supervised phase-fault tripping of the fault, even though it is an internal fault, within the protected line-section.

In any practical carrier-current relaying system, it is highly desirable, for many reasons, to minimize the number of relay-contacts which are required, and particularly to minimize the number of contacts which have to be carried by the sensitive fault-detector elements, directional elements and distance-measuring elements. There are reasons why such relaying systems should utilize a more sensitive fault-responsive element in the carrier-starting relaying-circuit than the fault-responsive element which is utilized in the carrier-supervised tripping-circuit, and this consideration, coupled with the consideration respecting the utilization of a minimum number of contacts, has resulted in the utilization of the directional and fault-detecting part of the carrier-supervised tripping-circuit to control the stopping of carrier-current transmission. This does not result in any error, in the case of the phase-fault relays, where "phase-preference" is not utilized, but it is susceptible to error, as above pointed out, under certain conditions involving faint or uncertain responses of the ground-fault relays, at a time when the phase-fault relays should have control, where "ground preference" is utilized.

The principal object of the present invention is to provide a ground-preference system in which the directionally responsive ground-fault carrier-stopping element is as sensitive as the ground-fault carrier-starting elements.

A more specific object of the invention is to provide such a system with a time-hesitation means, such as may be provided by an ordinary, fairly fast auxiliary ground-fault relay, for avoiding a response to a jiggling of the contacts of the sensitive ground-directional relay, and also for the purpose of avoiding a too quick restoration of carrier-current transmission upon the de-energization of the ground-directional element after or during the clearing of a fault.

Figure 2:
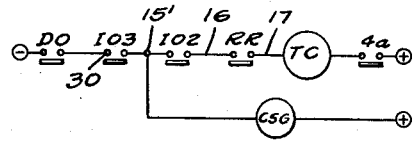
Figure 3:
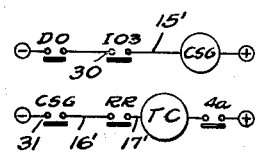

With the foregoing and other objects in view, the invention consists in the systems, combinations, circuits, apparatus, elements and methods hereinafter described and claimed, and illustrated in the accompanying drawing, wherein Figure 1 is a diagrammatic view of circuits and apparatus illustrating the invention in a preferred form of embodiment, and Figs. 2 and 3 are details of a portion of the direct-current connections, showing modifications.

Fig. 1 illustrates one terminal of a protected three-phase line-section 1, which is a part of a 60-cycle transmission line or system which is connected to a bus 3 at the illustrated terminal. The protected line-section 1 is provided with a three-phase line-segregating circuit-breaker 4, which is illustrated as having an auxiliary make-switch 4a, and having a trip-coil TC. Since the protective equipments at both terminals of the protected line-section 1 are, or may be, identical, an illustration and description of one terminal equipment will suffice.

The protective relaying equipment, as illustrated in Fig. 1, comprises phase-relays 5, 6 and 7, for the three phases A, B and C of the line, and a ground-relay 8. Since the three-phase-relays 5, 6 and 7 are similar, a detailed illustration and description of the phase-A relay 5 will suffice for all three.

Line-responsive relaying currents and voltages are provided by means of line-current transformers 10 and potential transformers 11, auxiliary current-transformers 12, and auxiliary potential transformers 13.

The relaying equipment is illustrated as comprising four directionally responsive elements D, which are distinguished by the additional letters A, B, C and O for distinguishing between the three-line-phases A, B and C and the zero-sequence currents and voltages, respectively. The relaying system which is illustrated in Fig. 1 further comprises first-zone phase-fault distance-responsive elements which are illustrated as impedance-elements Z1A, Z1B and Z1C, for the three phases, second- and third-zone phase-fault impedance-elements Z2A, Z2B, Z2C, and Z3A, Z3B, Z3C. The illustrated relaying system, in Fig. 1, also includes a sensitive residual overcurrent relay 103, and a less sensitive residual overcurrent relay 102, the latter having sufficient sensitivity however, to respond to faults which may lie beyond the remote terminal of the protected line-section.

The operating coils and the contacts of the various relays are designated by the letters which constitute the relay-designation, so that the relay-designation is sufficient to indicate both the operating-coils and the contacts of the various relays, the relays being illustrated in their un-energized positions.

In Fig. 1, the phase-A directional element DA is provided with an operating coil DA which is excited from the auxiliary current-transformers 12 so as to be responsive to the difference between the phase-A and phase-B line-currents $I_A - I_B$, or the delta-current $I_{AB}$. The directional element DA is also provided with a voltage-responsive polarizing coil $D_V$, which is energized from the potential-transformer 11 so as to be responsive to the delta line-voltage $E_{AC}$. The operating coils of the first- and second-zone impedance-relays Z1A and Z2A are energized in series with the DA coil, so as to be likewise responsive to the delta line-current $I_{AB}$. The operating coil of the third-zone impedance-relay Z3A is excited from the line-current transformer 10 in response to the phase-A line-current $I_A$. The three phase-A impedance-relays Z1A, Z2A and Z3A have voltage-restraint windings which are grouped altogether under the designation $Z_V$, energized in response to the delta line-voltage $E_{AB}$.

The ground-fault relaying panel 8 includes the operating coils of the ground-directional relay DO and the ground-overcurrent relays IO2 and IO3, which are energized by the residual current of the line-current transformers 10. In addition, the directional element DO has a voltage-responsive polarizing winding $D_{VO}$, which is excited responsively to the zero-sequence line-voltage which is obtained from the open-delta secondary winding 14 of the auxiliary potential transformers 13, which are in turn energized from the potential transformers 11.

In Fig. 1, the tripping circuits of the circuit-breaker 4 are indicated, in across-the-line diagram, from the negative relaying bus (—) to the positive relaying bus (+).

The ground-fault tripping-circuit in Fig. 1 is illustrated as a carrier-supervised circuit which is traceable from the negative bus (—), through the ground-current directional-relay contact DO, to a conductor 15, and thence through the less sensitive ground-fault detector-relay contact IO2 to a conductor 16, and then through a receiver-relay contact RR to a tripping bus or conductor 17, from whence the trip-circuit is completed through the trip-coil TC and the auxiliary breaker-switch 4a to the positive bus (+).

The phase-fault tripping-circuits of Fig. 1 may be properly indicated by tracing out the connections for only one of the phases, such as the phase A. A first phase-fault tripping-circuit is traceable from the negative bus (—), through the directional-contact DA, to a conductor 18, and thence through the first-zone distance-element Z1A to the tripping bus 17. A second phase-fault tripping-circuit is connected to the conductor 18 which was just mentioned, and continues on through the second impedance element Z2A to a conductor 19 which is common for all three of the phases. From the conductor 19, a common, carrier-supervised, phase-fault tripping-circuit is continued through a second contact of the receiver relay RR, which connects the conductor 19 to the tripping bus 17.

In order to provide additional directionally controlled or responsive contacts, it has been customary, heretofore, in accordance with a well-known relay system, to provide two auxiliary relays or contactor-switches CSG and CSP, to be responsive to ground-faults and phase-faults respectively. The auxiliary phase-fault contactor-switch CSP has its operating coil energized from the common phase-fault conductor 19, so as to be responsive whenever the directional element and the second-zone distance-element both close their trip-circuit contacts in response to a fault on any one of the three phases A, B and C. This is in accordance with the usual connection of the CSP coil.

In accordance with the present invention, the CSG coil is not energized from the conductor 16 in the ground-fault tripping-circuit, so as to be responsive to the ground-fault directional element DO, supervised by the less sensitive ground-fault detector-element IO2, as was heretofore the practice, but the CSG coil is energized from the conductor 15, so as to be responsive only to the ground-directional element DO, and this ground-directional element DO is made as sensitive as the sensitive ground-fault detector-element IO3.

The receiver-relay RR, in the form of embodiment of the invention which is illustrated in Fig. 1, is a part of a carrier-current system including a transmitter 20, which is represented by a simple oscillator-tube OSC, and a receiver 21 which is represented by a simple receiver-tube REC. The carrier-current transmitter-receiver equipment 20—21 is connected to a coupling transformer 22, which is coupled to the phase-C line-conductor through a coupling-capacitor 23, in a well-known manner.

The receiver-relay itself is provided with an operating coil RR, shown in the line under the CSP coil in Fig. 1, and a restraining or holding-coil $RR_H$, shown associated with the receiver-equipment 21. The receiver-relay holding-coil RR$_H$ is energized whenever carrier-current is transmitted from either end of the protected line-section.

In the system illustrated in Fig. 1, carrier-current transmission is initiated by applying a negative potential to the cathode-circuit 24 of the transmitter-oscillator OSC, in response to any one of the third-zone or sensitive elements Z3A, Z3B, Z3C or IO3. The make-contacts of the three third-zone phase-elements Z3A, Z3B and Z3C are connected in parallel with each other to energize a conductor 25 from the negative bus (—). From the conductor 25, a carrier-controlling circuit is completed through the back-contact of the auxiliary phase-fault relay CSP, and thence to a conductor 26, from which the carrier-controlling circuit is continued, through the back-contact of the auxiliary ground-fault relay CSG to the cathode-circuit 24. The sensitive ground-fault detector IO3 has its make-contact 27 connected around the CSP contact, so as to join the conductor 26 directly to the bus (—), thus providing ground preference, in a usual and well understood manner.

The receiver-relay operating-coil RR is connected in shunt-circuit relation around the back-contacts of the CSP and CSG relays, in a circuit 29 which is connected between the conductors 25 and 24, so that the receiver-relay operating-coil RR is energized whenever either one of the auxiliary directionally controlled contactor-switches CSP or CSG is energized.

In the operation of the system shown in Fig. 1 carrier-current transmission is started by connecting the cathode-circuit 24 to the negative bus (—), as a result of a response of any one of the sensitive fault-detectors Z3A, Z3B, Z3C or IO3, and carrier-current transmission is stopped by a response of either one of the directionally controlled auxiliary relays CSP or CSG, with the difference that if the ground-fault carrier-starting element IO3 responds, it makes it impossible for the directionally controlled phase-fault element CSP to stop carrier, and if the ground-fault carrier-stopping element CSG responds, carrier-current transmission is stopped, regardless of anything else. This is the "ground preference" feature.

In accordance with the present invention, the directionally controlled ground-fault carrier-stopping element CSG is an element which responds to the ground-fault or residual-current direction fully as sensitively as the ground-fault carrier-stopping element IO3. This is accomplished by putting the CSG element under the control of the ground-fault directional element, without supervision of the less sensitive ground-fault detector-element IO2 which is utilized in the carrier-supervised ground-fault tripping-circuit 16.

In this manner, the directionally controlled ground-fault element CSG is able to get carrier-current off of the protected line-section, at the relaying terminal, if the residual-current direction is into the protected line-section, or indicative of the presence of a fault involving ground-current on the side of the bus 3 which is toward the protected line-section 1. Thus on an internal phase-to-phase fault, with only a light ground, insufficient to pick up the IO2 element, there is no danger that carrier-current will be put on by the more sensitive ground-fault carrier-starting element IO3, without being taken off by the ground-fault carrier-stopping element CSG which sensitively responds to the "internal" direction of the ground-current.

My directionally controlled ground-fault element CSG also has an advantage over previous systems, in the event of internal phase-to-phase and three-phase faults where ground-current appears as a result of unbalances in the primary system, such, for instance, as a lack of sufficient transpositions (not shown) in the phase-wires of the transmission line 1. Under this condition, the ground-current will show up in both coils DO and D$_{vo}$ of the directional element DO, and this element will respond to remove the carrier.

Care should be taken, however, not to make the sensitivity of the ground-fault carrier-stopping element CSG too great, otherwise carrier-current may be erroneously removed from one terminal of a sound line-section 1 in the event of an external phase-fault, or a phase-fault somewhere on the transmission-system other than on the protected line-section 1, where spurious ground-current may cause the sensitive ground-fault carrier-stopping element CSG to operate, thus removing carrier, at a line-terminal where it is necessary that carrier be left on, in order to block erroneous tripping of the sound section.

The carrier-current blocking-action results from the utilization of a carrier-current receiver-relay RR having a restraining or holding coil RR$_H$ which is energized in response to carrier-current which is transmitted from either end of the protected line-section, the holding-coil RR$_H$ being strong enough to prevent a response of the receiver-relay RR, notwithstanding a simultaneous energization of the receiver-relay operating-coil RR, so that the receiver-relay contacts RR, in either the ground-fault or the phase-fault tripping-circuits 16—17 or 19—17, will not be closed as long as carrier-current is being put onto the protected line-section at either end thereof, which is another way of saying that the receiver-relay tripping-contacts RR will not close until there has been an internal directional indication at both ends of the protected line-section.

While the directional ground-element DO could be utilized directly, by having a back-contact thereof placed in the carrier-controlling circuit in the place shown for the CSG back-contact, it is an advantageous feature to utilize the auxiliary ground-directional contactor-switch or relay CSG, which not only avoids the utilization of an extra contact on the sensitive, and hence lightweight, directional element DO, but it also avoids the possibility of an accidental tripping-operation due to a momentary removal of carrier-current in response to a jiggling of the contact of the sensitive directional element DO. The use of an auxiliary relay CSG interposes a certain time-hesitation, which may be of the order of a quarter of a cycle, more or less, but which is nevertheless sufficient to avoid such erroneous jiggling-responsive tripping. The auxiliary directional element CSG also introduces time-delays which are useful in coordinating the carrier-current operation, by "delays" in this case, meaning hesitational periods of the order of a fraction of a cycle, and not delays of magnitudes corresponding to back-up protection.

These time-hesitational periods are so brief that the carrier-supervised relaying-operation is still what is known as quick, or instantaneous, or immediately acting, as distinguished from sequential operations involving time-delays which are longer than the relaying-time plus the circuit-breaker operating-time, plus a certain factor of safety, intended to permit faults to be normally cleared at other points between the relaying terminal and the fault.

In Fig. 1, for simplicity in illustrating and explaining the present invention, the usual time-delayed tripping-circuits, for back-up protection, have been omitted, but it is to be understood that any suitable back-up protection may be utilized with the present invention, in the same manner, and to the same extent, as in previously known relaying systems.

It is also to be understood that the embodiment of the present invention which is shown in Fig. 1 is merely illustrative of the invention, as many modifications or variations may be introduced, without distinguishing from the essential spirit of the invention.

Thus, in Fig. 2, a variation of the ground-fault tripping-circuit has been introduced, in which a make-contact 30 of the sensitive ground-fault detector-element IO3 is interposed in series with the DO contact, between the negative bus (—) and the conductor 15', which corresponds to the conductor 15 in Fig. 1. Otherwise the circuits are the same, in Figs. 1 and 2. The result of introducing the IO3 contact 30, in the tripping-circuit 16, and in the energizing circuit of the CSG coil, is to make sure that the auxiliary directional response of the CSG element is not too sensitive, that is, not more sensitive than the ground-fault carrier-starting response which controls the contact 27 in Fig. 1.

With the provision of the extra contact 30, as shown in Fig. 2, the designer is relieved of the necessity for very accurately matching the sensitivity of the directional element DO with the sensitivity of the ground-overcurrent element IO3, which is particularly difficult in view of the fact that the directional element is responsive to residual voltages, which may be variable. In the Fig. 2 form of embodiment, the directional element DO may be more sensitive than necessary, but supervised by the IO3 contact 30, which reduces its effective sensitivity to the desired amount, without, however, reducing the sensitivity by the amount which is involved in the less sensitive ground-fault element IO2.

Fig. 3 shows a further variation of the invention, in which the extra IO3 contact 30 is utilized, as just described in connection with Fig. 2, but the conductor 15' which is energized by the contacts of DO and IO3 in series, is utilized only for energizing the CSG coil, and not as a part of the carrier-supervised ground-fault tripping-circuit 16, as in Fig. 2. In Fig. 3 the auxiliary directionally responsive ground-fault relay CSG is provided with an extra make-contact 31, which is utilized to energize a trip-circuit conductor 16' from the negative bus (—), the tripping circuit being continued, from the conductor 16', through the receiver-relay contact RR to a conductor 17', and thence to the trip coil TC and the auxiliary breaker-switch 4a, as clearly shown in Fig. 3.

In operation, the system shown in Fig. 3 frequently avoids the necessity for the less sensitive ground-detector contact IO2 which is utilized in the ground-fault tripping-circuits 16 of both Figs. 1 and 2.

In Figs. 1 and 2, the IO2 tripping-contact had to be utilized, in addition to the IO3 carrier-starting contact 27, to make sure that carrier is started at the far end, close to a light external ground-fault (beyond the far end of the protected line-section), before a trip-circuit can be completed at the relaying terminal, which is the end farthest away from said external ground-fault. While the IO2 and IO3 relays are both instantaneous relays, nevertheless at their balance-points, or when energized with currents which are barely strong enough to cause the relay to respond, they will be somewhat sluggish in their action. Thus, the provision of two instantaneous relays IO2 and IO3, with different sensitivities, makes it certain that, if there should be any delay in either one of these relays, because of sluggish action near the balance-point of that relay, the delay shall be in the tripping-circuit, in the response of the IO2 element, rather than in the carrier-controlling circuit, under the control of the contact 27 of the IO3 element.

In Fig. 3, this difficulty is avoided by inserting, in the ground-fault tripping-circuit 16', a time-hesitation involved in the pick-up time of the auxiliary relay CSG, which makes certain that a carrier-supervised ground-fault tripping-action is not obtained, at the relaying station in question, before the IO3 ground-fault carrier-starting contact 27 at the other terminal of the line-section has had time to respond and get carrier-current onto the line. This feature, as illustrated in Fig. 3, is obviously not limited to ground-fault tripping-circuits, but may be applied to any carrier-supervised tripping-circuits, or any tripping circuits containing a receiver-relay contact RR.

I claim as my invention:

1. Terminal protective equipment for protecting a terminal of a polyphase line-section, comprising the combination, with a line-segregating circuit-interrupting means at that terminal of the line-section, of signal-means for at times transmitting a signal from the relaying terminal to the far-end terminal of the protected line-section, a receiver-relay having a restraint means which is responsive to a signal transmitted from said far-end terminal, line-fault-responsive relaying-means including ground-fault and phase-fault detector-means and ground-fault and phase-fault internal-direction-responsive directional means, signal-control means for starting said signal-transmission from the relaying terminal in response to a response of a sensitive ground-fault or phase-fault detector-means and for stopping said signal-transmission from the relaying terminal in response to a response of said directional means, with ground preference, and signal-supervised line-segregating control-means for effecting a line-segregating operation of said circuit-interrupting means in response to responses including a response of said receiver-relay and a response of a less sensitive detector-means, the signal-stopping ground-fault directional means being substantially as sensitive as the signal-starting ground-fault detector-means.

2. Terminal protective equipment for protecting a terminal of a polyphase line-section, comprising the combination, with a line-segregating circuit-interrupting means at that terminal of the line-section, of signal-means for at times transmitting a signal from the relaying terminal to the far-end terminal of the protected line-section, a receiver-relay having a restraint means which is responsive to a signal transmitted from said far-end terminal, line-fault-responsive relaying-means including ground-fault and phase-fault detector-means and ground-fault and phase-fault internal-direction-responsive directional means, signal-control means for starting said signal-transmission from the relaying terminal in response to a response of a sensitive ground-fault or phase-fault detector-means and for stopping said signal-transmission from the relaying terminal in response to a response of said directional means, with ground preference; and signal-supervised line-segregating control-means for effecting a line-segregating operation of said circuit-interrupting means in response to responses including a response of said receiver-relay and a response of a directional means, the signal-stopping ground-fault directional means being substantially as sensitive as the signal-starting ground-fault detector-means.

3. Terminal protective equipment for protecting a terminal of a polyphase line-section, comprising the combination, with a line-segregating circuit-interrupting means at that terminal of the line-section, of signal-means for at times transmitting a signal from the relaying terminal to the far-end terminal of the protected line-section, a receiver-relay having a restraint means which is responsive to a signal transmitted from said far-end terminal, line-fault-responsive relaying-means including ground-fault and phase-fault detector-means and ground-fault and phase-fault internal-direction-responsive directional means, signal-control means for starting said signal-transmission from the relaying terminal in response to a response of a sensitive ground-fault or phase-fault detector-means and for stopping said signal-transmission from the relaying terminal in response to a response of said directional means, with ground preference, and signal-supervised line-segregating control-means for effecting a line-segregating operation of said circuit-interrupting means in response to responses including a response of said receiver-relay and a directional response which is less sensitive to fault-conditions than the signal-stopping ground-fault or phase-fault directional means as the case may be, the signal-stopping ground-fault directional means being substantially as sensitive as the signal-starting ground-fault detector-means.

4. Terminal protective equipment for protecting a terminal of a polyphase line-section, comprising the combination, with a line-segregating circuit-interrupting means at that terminal of the line-section, of signal-means for at times transmitting a signal from the relaying terminal to the far-end terminal of the protected line-section, a receiver-relay having a restraint means which is responsive to a signal transmitted from said far-end terminal, line-fault-responsive relaying-means including ground-fault and phase-fault detector-means and ground-fault and phase-fault internal-direction-responsive directional means, signal-control means for starting said signal-transmission from the relaying terminal in response to a response of a sensitive ground-fault or phase-fault detector-means and for stopping said signal-transmission from the relaying terminal in response to a response of said directional means, with ground preference, and signal-supervised line-segregating control-means for effecting a line-segregating operation of said circuit-interrupting means in response to responses including a response of said receiver-relay and a time-hesitational response of a directional means, the signal-stopping ground-fault directional means being substantially as sensitive as the signal-starting ground-fault detector-means.

5. Terminal protective equipment for protecting a terminal of a polyphase line-section, comprising the combination, with a line-segregating circuit-interrupting means at that terminal of the line-section, of signal-means for at times transmitting a signal from the relaying terminal to the far-end terminal of the protected line-section, a receiver-relay having a restraint means which is responsive to a signal transmitted from said far-end terminal, line-fault-responsive relaying-means including detector-means and internal-direction-responsive directional means, signal-control means for starting said signal-transmission from the relaying terminal in response to said detector-means and for stopping said signal-transmission from the relaying terminal in response to a time-hesitational response of said directional means, and signal-supervised line-segregating control-means for effecting a line-segregating operation of said circuit-interrupting means in response to responses including a response of said receiver-relay and a time-hesitational response of the same directional response which controlled the signal-stopping, the signal-stopping directional means being substantially as sensitive as the signal-starting detector-means.

6. Terminal protective equipment for protecting a terminal of a polyphase line-section, comprising the combination, with a line-segregating circuit-interrupting means at that terminal of the line-section, of signal-means for at times transmitting a signal from the relaying terminal to the far-end terminal of the protected line-section, a receiver-relay having a restraint means which is responsive to a signal transmitted from said far-end terminal, line-fault-responsive relaying-means including quickly acting detector-means and time-hesitational directional means, signal-control means for starting said signal-transmission from the relaying terminal in response to a response of a quickly acting detector-means and for stopping said signal-transmission from the relaying terminal in response to a time-hesitational directional means, and signal-supervised line-segregating control-means for effecting a line-segregating operation of said circuit-interrupting means in response to responses including a response of said receiver-relay and a response of a time-hesitational directional means.

7. Terminal protective equipment for protecting a terminal of a polyphase line-section, comprising the combination, with a line-segregating circuit-interrupting means at that terminal of the line-section, of signal-means for at times transmitting a signal from the relaying terminal to the far-end terminal of the protected line-section, a receiver-relay having a restraint means which is responsive to a signal transmitted from said far-end terminal, line-fault-responsive relaying-means including a plurality of ground-fault and phase-fault detector-elements of different sensitivities and ground-fault and phase-fault internal-direction-responsive directional elements, an auxiliary ground-fault relay energized so as to be responsive to said ground-fault directional element and so as to be unresponsive to any of the less sensitive ones of the plurality of ground-fault detector-elements, an auxiliary phase-fault relay energized so as to be responsive to said phase-fault directional element, signal-control means for starting said signal-transmission from the relaying terminal in response to a response of a sensitive ground-fault or phase-fault detector-element and for stopping said signal-transmission from the relaying terminal in response to a response of the corresponding auxiliary relay, with ground preference, and ground-fault and phase-fault signal-supervised line-segregating control-means for effecting a line-segregating operation of said circuit-interrupting means in response to responses including a response of the corresponding directional element, a less sensitive one of the plurality of corresponding detector-elements, and the receiver-relay, the ground-fault directional element being substantially as sensitive as the sensitive ground-fault detector element.

8. Terminal protective equipment for protecting a terminal of a polyphase line-section, comprising the combination, with a line-segregating circuit-interrupting means at that terminal of the line-section, of signal-means for at times transmitting a signal from the relaying terminal to the far-end terminal of the protected line-section, a receiver-relay having a restraint means which is responsive to a signal transmitted from said far-end terminal, line-fault-responsive relaying-means including a plurality of ground-fault and phase-fault detector-elements of different sensitivities and ground-fault and phase-fault internal-direction-responsive directional elements, an auxiliary ground-fault relay energized so as to be responsive solely to said ground-fault directional element, an auxiliary phase-fault relay energized so as to be responsive to said phase-fault directional element, signal-control means for starting said signal-transmission from the relaying terminal in response to a response of a sensitive ground-fault or phase-fault detector-element and for stopping said signal-transmission from the relaying terminal in response to a response of the corresponding auxiliary relay, with ground preference, and ground-fault and phase-fault signal-supervised line-segregating control-means for effecting a line-segregating operation of said circuit-interrupting means in response to responses including a response of the corresponding directional element, a less sensitive one of the plurality of corresponding detector-elements, and the receiver-relay, the ground-fault directional element being substantially as sensitive as the sensitive ground-fault detector-element.

9. Terminal protective equipment for protecting a terminal of a polyphase line-section, comprising the combination, with a line-segregating circuit-interrupting means at that terminal of the line-section, of signal-means for at times transmitting a signal from the relaying terminal to the far-end terminal of the protected line-section, a receiver-relay having a restraint means which is responsive to a signal transmitted from said far-end terminal, line-fault-responsive relaying-means including a plurality of ground-fault and phase-fault detector-elements of different sensitivities and ground-fault and phase-fault internal-direction-responsive directional elements, an auxiliary ground-fault relay energized so as to be responsive to said ground-fault directional element and to the sensitive ground-fault detector-element, an auxiliary phase-fault relay energized so as to be responsive to said phase-fault directional element, signal-control means for starting said signal-transmission from the relaying terminal in response to a response of a sensitive ground-fault or phase-fault detector-element and for stopping said signal-transmission from the relaying terminal in response to a response of the corresponding auxiliary relay, with ground preference, and ground-fault and phase-fault signal-supervised line-segregating control-means for effecting a line-segregating operation of said circuit-interrupting means in response to responses including a response of the corresponding directional element, a less sensitive one of the plurality of corresponding detector-elements, and the receiver-relay, the ground-fault directional element being substantially as sensitive as the sensitive ground-fault detector-element.

10. The invention as defined in claim 9, characterized by the ground-fault signal-supervised line-segregating control-means being also responsive to the sensitive ground-fault dectector-element.

11. Terminal protective equipment for protecting a terminal of a polyphase line-section, comprising the combination, with a line-segregating circuit-interrupting means at that terminal of the line-section, of signal-means for at times transmitting a signal from the relaying terminal to the far-end terminal of the protected line-section, a receiver-relay having a restraint means which is responsive to a signal transmitted from said far-end terminal, line-fault-responsive relaying-means including sensitive ground-fault and phase-fault detector-elements and ground-fault and phase-fault internal-direction-responsive directional elements, auxiliary ground-fault and phase-fault relays energized so as to be responsive to the corresponding directional element, signal-control means for starting said signal-transmission from the relaying terminal in response to a response of a sensitive ground-fault or phase-fault detector-element for stopping said signal-transmission from the relaying terminal in response to a response of the corresponding auxiliary relay, with ground preference, and ground-fault signal-supervised line-segregating control-means for effecting a line-segregating operation of said circuit-interrupting means in response to responses including a response of the auxiliary ground-fault relay and the receiver-relay, the ground-fault directional element being substantially as sensitive as the sensitive ground-fault detector-element.

12. The invention as defined in claim 11, characterized by the auxiliary ground-fault relay being also responsive to the sensitive ground-fault detector-element.

13. Terminal protective equipment for protecting a terminal of a polyphase line-section, comprising the combination, with a line-segregating circuit-interrupting means at that terminal of the line-section, of signal-means for at times transmitting a signal from the relaying terminal to the far-end terminal of the protected line-section, a receiver-relay having a restraint means which is responsive to a signal transmitted from said far-end terminal, line-fault-responsive relaying-means including a sensitive detector-element and an internal-direction-responsive directional element, an auxiliary relay energized so as to be responsive to both of said elements, signal-control means for starting said signal-transmission from the relaying terminal in response to a response of said sensitive detector-element and for stopping said signal-transmission from the relaying terminal in response to said auxiliary relay, and signal supervised line-segregating control-means for effecting a line-segregating operation of said circuit-interrupting means in response to responses including a response of said auxiliary relay and said receiver-relay.

SHIRLEY L. GOLDSBOROUGH.